Dec. 31, 1968　　　J. ULDERUP　　　3,419,294
UNIVERSAL JOINT HAVING MOVABLE BEARING PARTS
MADE OF A NON-RUSTING MATERIAL AND
NON-MOVABLE PARTS COATED WITH
A NON-RUSTING MATERIAL
Filed Jan. 19, 1967

INVENTOR.
JÜRGEN ULDERUP
BY
*McGlew & Toren*
ATTORNEYS

3,419,294
UNIVERSAL JOINT HAVING MOVABLE BEARING PARTS MADE OF A NON-RUSTING MATERIAL AND NON-MOVABLE PARTS COATED WITH A NON-RUSTING MATERIAL
Jürgen Ulderup, Bergstrasse, Lemforde-Hannover, Germany
Filed Jan. 19, 1967, Ser. No. 610,345
Claims priority, application Germany, Mar. 31, 1966, U 12,564
8 Claims. (Cl. 287—87)

ABSTRACT OF THE DISCLOSURE

The invention deals with a universal joint in which the hinge pin has a hemispherical or ball-shaped end which rides in a housing having a bearing box which is similarly contoured to permit universal movement of the hinge pin by sliding of the ball relative to the bearing box surface. A feature of the construction is that all of the moving parts, for example the bearing box and the ball head of the hinge pin as well as the inner wall of the housing, are made of a rust-proof material. Such a material may advantageously comprise stainless steel, bearing metals, preferably in a sintered form, plastics and possibly also ceramic materials. The other parts of the joint, for example the outer part of the housing, the housing cover, are provided on their exterior surfaces with a thin coat of a rust-preventing material.

In accordance with another embodiment of the invention, the hinge-pin is made of a frusto-conical configuration and an annular bearing body is fitted over the hinge pin and it includes a hemispherical outer surface which is in sliding engagement with the internal bearing surface defined by a bearing box retained within the housing. In this construction a thin coat of rust-preventing material is provided over the surface of the hinge pin and over the interior surface of the housing and the cover.

In another embodiment the hinge pin is made with a partial spherical end having a collar against which is positioned an annular body or calotte. The hemispherical end of the hinge pin is pressure loaded by a resilient ring member or bearing box member. Since this bearing element is also affected by the sliding movement of the hinge pin, it has a bearing surface similar to the bearing surfaces of the bearing box on the interior of the housing and the annular body around the hinge pin and it is made of a rust-proof material, preferably an elastic plastic or a bearing metal with a porous structure. The bearing metal with the porous structure is advantageously provided with a suitable lubricant in order to increase the sliding capacity. The inner wall of the housing and the inner surface of the cap are provided with a rust-preventing material coating.

*Brief summary of the invention*

In the wheel suspension joints for motor vehicles the hinge pin is arranged in a housing for movement in all directions with the interposition of special bearing boxes. The bearing boxes comprise materials which have sound-damping and shock-damping characteristics, for example elastic plastic sintered metal or other suitable material. It is generally required that the joint be as maintenance-free as possible and protected against premature wear and obsolescence in order to insure safe operation and a long life. Such joint housings are sealed against the penetration of dust, water and road dirt. In order to seal these housings, bellows are employed between the hinge pin and the housings and a cover cap for the housing is employed at the opposite end. Usually the caps are applied over disk-shaped or ring-shaped bodies having elastic characteristics, for example a polyurethane plastic. A complete seal of the joint housing can hardly be achieved, however, because the sealing elements cannot be protected against damage by falling rocks and other external influences without requiring considerable additional expenditures. In many cases it therefore cannot be prevented that the seals are mounted improperly so that passages are formed through which at least water can get into the housing. But even seals mounted with all the possible care do not protect the construction sufficiently if water hits the joints under high pressure of up to 6 atmospheres absolute which can be expected when cars are washed at washing stations. If cars with these joints are used in regions where there are great variations in the air temperatures between day and night, it cannot be avoided, despite careful sealing, that the water or condensation will be formed in the joint housing. In all of these cases the presence of water in the joint housing will produce a very rapid corrosion. The rust penetrates under the constant movements of all of the joint parts into all of the corners of the joint housing and corrodes the bearing surfaces of the joint. This leads at first to undesired stiffness of the joint and soon thereafter the joint becomes useless. Particularly affected are the bearing and supporting surfaces of bearing boxes which are made of elastic plastic or of a damping material for damping shocks and noises. For this reason, bearing boxes having a material with a partly porous surface or a completely porous surface or with a surface interrupted by lubricating grooves are employed. However, the properties of these materials which are otherwise favorable for bearing purposes are soon destroyed by rust.

Accordingly it is an object of the present invention to provide a universal joint construction which includes parts of rust-proof material and also parts which are coated with a rust-preventing material and which provides a joint which does not have the shortcomings of the prior art and which has an increased life expectancy and requires very little maintenance. A feature of the construction is that all of the elements of the joint which have bearing surfaces such as the spherical or hemispherical bearing surfaces of the hinge pin and, if necessary, also its shaft as well as all bearing parts participating in sliding movement of the hinge pin, such as the bearing shells, calottes, etc. are made of a rust-proof material. The elements not affected by the sliding movement of the hinge pin such as the joint housing and its closing parts as well as other parts arranged inside the joint housing, and if necessary also the shaft of the hinge pin, are provided with a coat of rust-preventing material. Thus, the invention and the resulting advantages therefrom are based on the concept of finding a thorough solution for a problem in the manufacture of joints which has heretofore only been incompletely solved. This solution is achieved not by means of sealing of the joint alone but by a design of the various elements of the joints so that they are protected against any attack of water. By the construction outlined above, all corrosion of the joint is prevented and all shortcomings which are due to the presence of rust are substantially eliminated. With the construction of the invention, even if water should penetrate into the housing because of some untightness of the parts and water condensation should be formed, the affected parts of the joint will remain protected against the formation of rust.

Accordingly it is an object of the invention to provide a universal joint which is constructed so as to be substantially free of any susceptibility to rusting.

A further object of the invention is to provide a universal joint construction in which the bearing and/or moving parts are made of a non-rusting material and in which the remaining parts are covered with a coating of rust-preventing material.

A further object of the invention is to provide a universal joint which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

*Detailed description*

Figure 1:
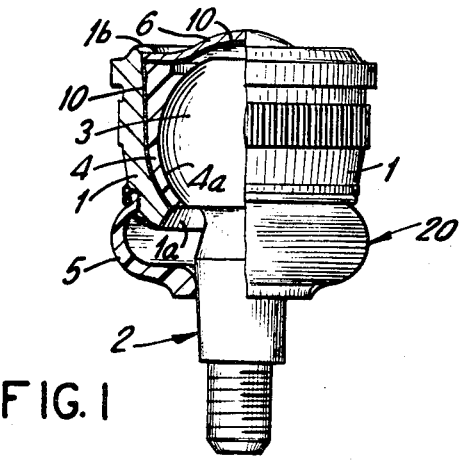
FIG. 1 is a partial sectional and elevational view of a universal joint constructed in accordance with the invention.

Referring to the drawings in particular, the invention embodied therein comprises in FIG. 1 a universal joint generally designated 20 which includes a substantially cylindrical housing 1 having an interior semi-spherical surface upon which is positioned a bearing box or liner member 4 which, in turn, has a hemispherical surface 4a for universally pivotally supporting a head portion or ball-shaped head 3 of a hinge pin generally designated 2. In this embodiment, the ball head 3 is made as a solid sphere. The housing 1 includes an opening 1a through which the pin portion of the hinge pin 2 extends. The housing is sealed at this end against the penetration of solid particles such as sand and dust by an elastic bellows 5 which is secured to the housing 1 and to the pin portion of the hinge pin 2 such as by a resilient retaining ring. The top of the housing 1 is closed by a cover or cap 6 which is engaged under a flange portion 1b of the housing.

In accordance with the invention, the ball head 3 and the bearing shell 4 are made of a rust-proof material such as a stainless steel, a bearing metal in sintered form, a plastic and in some instances a ceramic material. In the embodiment shown, a stainless steel is provided for the ball head 3 while the bearing shell 4 is made of a suitable metal for bearing purposes. The other parts of the joint which do not include exposed surfaces on which there is sliding movement including the housing 1 and the cap 6 are provided at their surfaces facing the interior of the joint with a thin coat 10 of a rust-preventing material. The coat 10 may advantageously comprise a suitable metallic material such as cadmium and the like or a plastic of a suitable type which is applied preferably by spraying or in any other known manner.

Figure 2:
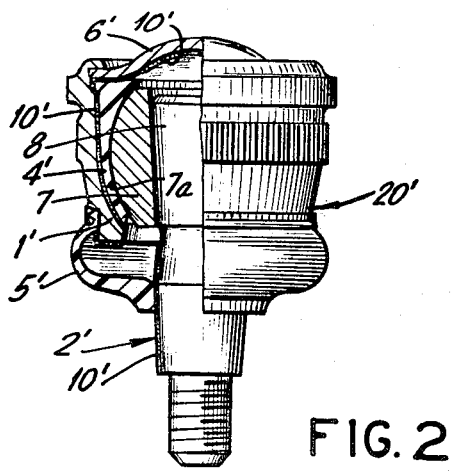
FIG. 2 is a view similar to FIG. 1 of another embodiment of the invention.

In the embodiment of FIG. 2 there is provided a universal joint generally designated 20' which includes a hinge pin generally designated 2' having a frusto-conical head portion 8 around which is positioned an annular body 7. The annular body 7 includes an outer spherical surface 7a which is pivotally supported within a bearing box 4' having a complementary spherical surface. In this construction, the bearing box 4' and the annular body 7 are made of a rust-proof material. Because the hinge pin 2' does not include a bearing surface, it is advantageously coated with a coating 10' which is advantageously made to extend along the complete length of the outer portion thereof. A coating 10' is also applied to the interior of the cover and to the interior of the housing 1' as in the other embodiment.

Figure 3:
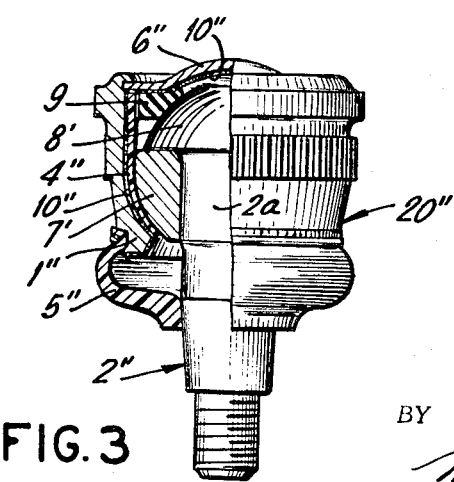
FIG. 3 is a view similar to FIG. 1 of still another embodiment of the invention.

In the embodiment of FIG. 3 there is provided a universal joint generally designated 2''. In this embodiment, the hinge pin 2'' is provided with a head portion 8' which is of hemispherical configuration and is pressure-loaded by means of an additional bearing box member or resilient ring 9. The ring 9 is compressed between the cover 6'' and the spherical head 8'. Since the bearing box member 9 is also in slidable engagement with the hinge pin portion 8', these two bearing elements are advantageously made of a rust-proof material. An annular member 7' which is disposed around a cylindrical portion 2a of the hinge pin also includes an exterior hemispherical surface which is in bearing contact with the bearing box 4', and each of these parts is made of a rust-proof material. The interior of the housing 1'' and the interior of the cap 6'' are advantageously provided with a coating 10'' of a rust-proof material. The parts which are coated, such as the housing 1 and the cap 6 in each of the embodiments, may advantageously be of ordinary steel.

While specific embodiments of the invention have been shown and described in detail to illustrate the application of the inventive principles, it will be understood that the invention may be embodied otherwise without departing from such principles.

What is claimed is:

1. A universal joint comprising a hollow substantially cylindrical housing having an opening at each end, a bearing liner in said housing having an inner partially spherical bearing surface, a hinge pin having an enlarged head portion within said housing and a pin portion extending through one of the open ends of said housing, a cover plate closing the opposite open end of said housing, means pivotally mounting said enlarged head portion on said bearing liner spherical bearing surface for universal pivotal movement and including a bearing surface in bearing engagement on the spherical bearing surface of said bearing liner, said bearing liner and said means pivotally mounting said pin head portion on said bearing liner being made of a rust-proof material, the interior surface of said housing and the surface of said cover plate within the interior of said housing being coated with a protective coating of a rust-preventing material.

2. A universal joint according to claim 1, wherein said means pivotally mounting said pin head includes a ball head formation on said hinge pin having an exterior spherical surface in bearing engagement on the spherical surface of said bearing liner.

3. A universal joint according to claim 1, wherein said hinge pin includes a frusto-conical head portion, said means pivotally mounting said pin head portion on said bearing liner comprising an annular member engaged over the frusto-conical head portion of said hinge pin and having an exterior spherical surface in bearing engagement on the spherical bearing surface of said bearing liner.

4. A universal joint according to claim 1, wherein said hinge pin includes a hemispherical end portion, and an annular member around said pin and bearing against the end of said hemispherical head portion and including a spherical surface defined on the exterior surface thereof in bearing engagement with the spherical surface of said bearing liner.

5. A universal joint according to claim 4, including a resilient bearing member disposed between said cover and the hemispherical end portion of said hinge pin, said resilient member being made of a rust-proof material.

6. A universal joint according to claim 3, including a coating of a rust-preventing material on said hinge pin and around said frusto-conical head portion.

7. A universal joint according to claim 5, said resilient member disposed between said cover and said hemispherical portion of said hinge pin being made of an elastic plastic material.

8. A universal joint according to claim 1, wherein said means pivotally mounting said pin head includes a ball-shaped head portion of said hinge pin in bearing engagement with the spherical bearing surface of said bearing line, said ball-shapped head portion being made of a stainless steel material, said bearing liner being made of a bearing metal.

References Cited

UNITED STATES PATENTS

| | | |
|---|---|---|
| 3,102,744 | 9/1963 | Reuter et al. |
| 3,095,224 | 6/1963 | Langen et al. _____ 287—87 |
| 3,363,921 | 1/1968 | Gottschald. |

ANDREW V. KUNDRAT, *Primary Examiner.*

C. W. TOMLIN, *Assistant Examiner.*

U.S. Cl. X.R.

287—90